United States Patent [19]

Wintermute

[11] Patent Number: 5,006,748
[45] Date of Patent: Apr. 9, 1991

[54] STATOR MOUNTING ARRANGEMENT

[75] Inventor: Pamela D. Wintermute, Glenmont, N.Y.

[73] Assignee: REM Technologies, Inc., Albany, N.Y.

[21] Appl. No.: 395,032

[22] Filed: Aug. 17, 1989

[51] Int. Cl.$^5$ .............................................. H02K 1/12
[52] U.S. Cl. ..................................... 310/258; 310/88; 310/91; 310/194; 310/254
[58] Field of Search ..................... 310/91, 89, 42, 216, 310/217, 254, 258, 259, 162, 164, 168, 194, 261, 214; 336/92

[56] References Cited

U.S. PATENT DOCUMENTS

| | | | |
|---|---|---|---|
| 437,501 | 9/1890 | Mordey | 310/168 |
| 1,784,643 | 12/1930 | Reist | 310/258 |
| 2,519,097 | 7/1947 | Allen | 310/168 |
| 2,719,239 | 9/1955 | Wanting | 310/258 |
| 3,912,958 | 10/1975 | Steen | 310/168 |
| 4,134,036 | 1/1979 | Curtiss | 310/42 |
| 4,284,920 | 8/1981 | Nelson | 310/217 |
| 4,661,734 | 4/1987 | Capuano et al. | 310/89 |
| 4,786,834 | 11/1988 | Grant et al. | 310/194 |
| 4,864,176 | 9/1989 | Miller et al. | 310/194 |

FOREIGN PATENT DOCUMENTS

| | | | |
|---|---|---|---|
| 619353 | 9/1935 | Fed. Rep. of Germany | 310/258 |
| 0115147 | 9/1981 | Japan | 310/261 UX |

Primary Examiner—R. Skudy
Attorney, Agent, or Firm—Heslin & Rothenberg

[57] ABSTRACT

An arrangement for mounting a stator assembly (12) of a dynamoelectric machine (10) in a housing (16) employs a plurality of circumferentially distributed mounting supports (56) on the interior of the housing (16) cooperating with pairs of axially aligned radial extensions (54) of the stator assembly (12). Opposed, axially inner faces (62) of paired radial extensions (54) sandwich axially outer end faces (60) of an associated mounting support (56). Threaded fasteners (52) secure the radial extensions (54) to the end faces (60) of the mounting supports (56). Oversized mounting holes (58) in the radial extensions (54) and shims (74) can be used to allow for lateral and axial adjustment, respectively, of the mounted stator assembly (12).

13 Claims, 9 Drawing Sheets

STATOR MOUNTING ARRANGEMENT

BACKGROUND OF THE INVENTION

1. Technical Field

This invention relates generally to rotating dynamoelectric machines and more specifically, to an improved arrangement for positioning and mounting the stator assembly of such machines within a surrounding housing.

2. Background Art

Inductor type dynamoelectric machines have been employed, in the past, to realize high-speed operation, particularly for electrical generation. Such machines are generally characterized by a stator which includes both AC armature and DC excitation coils, surrounding a coil-less rotor. Since there are no rotating field or armature coils in this type of dynamoelectric machine, slip rings, brushes and associated connections, common to machines having rotating windings, may be entirely eliminated. This feature, coupled with the typical solid construction of the machine rotor, makes the inductor machine particularly adaptable to high rotational speed applications.

One known version of an inductor type dynamoelectric machine, employs a circumferentially distributed arrangement of "C" or "U" shaped armature elements surrounding a generally cylindrical field coil which in turn encloses a transverse pole magnetic rotor. U.S. Pat. Nos. 437,501, and 2,519,097 and 3,912,958 describe earlier machines of this general design. Such machines typically employed frame mounted hardware for directly supporting the individual components of the stator and suffered from deficiencies attendant to this construction.

A more recent version of such an inductor type machine is disclosed in commonly owned, U.S. Pat. No. 4,786,834, issued Nov. 22, 1988 in the name of James J. Grant, et al. The improvement described therein encompasses a spool-like support structure for supporting the field winding and armature elements from inside and for accurately positioning the armature elements. The spool-like structure is made of non-magnetic material and has a hollow, elongated central portion extending concentrically about a longitudinal axis. This central portion supports a field coil and defines an interior longitudinal passageway for accommodating the insertion of a coaxial rotor. At each end of the central portion, end portions extend radially outward therefrom. Each of these end portions is preferably provided with radially oriented grooves in its axially outermost surface. The grooves are configured to receive and orient legs of generally U-shaped armature core elements arrayed in a circumferentially distributed pattern about the periphery of the spool-like structure. The end portions of the spool-like structure are axially spaced and radially dimensioned, and the grooves in the outer face of each end portion are angularly spaced so as to precisely position the armature elements in three orthogonal directions.

Other features, aspects, and advantages and benefits of this recently developed, highly acclaimed dynamoelectric machine are detailed in U.S. Pat. No. 4,786,834, the disclosure of which is incorporated by reference herein.

The spool-like stator support structure of earlier U.S. Pat. No. 4,786,834 was centered within a housing or frame, radially, by end portion extensions or spokes and axially by spacers located between the end portions of the spool-like structure and end shields of the housing. The stator assembly was interference fit within the housing. This was accomplished by heating the housing so that it thermally expanded before inserting the stator assembly and then allowing the housing to cool and shrink back into interference fit around the stator assembly.

This mounting approach, although it allowed for ready assembly and disassembly of the machine, also suffered from certain limitations. The interference fit required the radial extensions on the end portions of the spool-like support structure to be machined to tight tolerances and also prevented any adjustment or fine tuning of stator assembly position after mounting in the housing. The mounting process required auxiliary heating and cooling steps and equipment, applied stress to the spool-like support structure and did not ensure accurate axial positioning of the complete stator assembly. Accordingly, a new approach for securely and accurately positioning and mounting the stator assembly within the housing, which approach is less difficult, time consuming and expensive to implement, is desirable.

SUMMARY OF THE INVENTION

These needs are satisfied, and additional benefits realized, in accordance with the principles of the present invention by providing a mounting arrangement in which radial extensions of a support structure of the stator assembly cooperate with mounting supports circumferentially distributed about the interior of the housing. The mounting supports are sized and positioned to fit between pairs of substantially axially aligned radial extensions such that opposed axially inner faces of the radial extensions sandwich axially outer end faces of the mounting supports when the stator assembly is secured within the housing. The radial extensions are circumferentially sized and spaced such that the stator assembly can be inserted in the housing axially to a desired depth without interference with the mounting supports and then rotated about the longitudinal axis to position the inner faces of the radial extensions adjacent to and in substantial axial alignment with the end faces of the associated mounting supports. The mounting supports are prepositioned in the axial direction such that when the stator assembly is secured within the housing, the stator assembly is located in a desired axial position.

The stator assembly can be secured within the housing by fastening each pair of radial extensions to the end faces of the associated mounting support. Preferably, the fastening arrangement allows for adjustment of the position of the mounted stator assembly. To this end, the radial extensions can be provided with oversized mounting holes to permit lateral adjustment of the position of the mounted stator assembly and/or shims can be interposed between end faces of the mounting supports and inner faces of associated radial extensions to facilitate axial adjustment of the mounted stator assembly.

In one aspect of the present invention, the mounting supports can be cast integral parts of the housing. In another aspect, the housing can comprise a fabricated multi-piece assembly and extended stiffener elements can be incorporated with the mounting supports. Especially when used in larger dynamoelectric machines, the mounting supports can be fabricated as a pair of axially spaced mounting blocks.

Accordingly, a principle object of the present invention is to provide an improved arrangement for positioning and mounting a stator assembly of a dynamoelectric machine within a housing.

BRIEF DESCRIPTION OF THE DRAWINGS

These and other objects, advantages and features of the present invention will be more readily understood from the following detailed description, when considered in conjunction with the accompanying drawings, in which.

DETAILED DESCRIPTION

Referring now to the accompanying drawings in which like elements are referred to by like reference numbers, specific embodiments of the invention will now be described in detail. In this specification the terms "stator" and "stator assembly" are used interchangeably.

Figure 1:
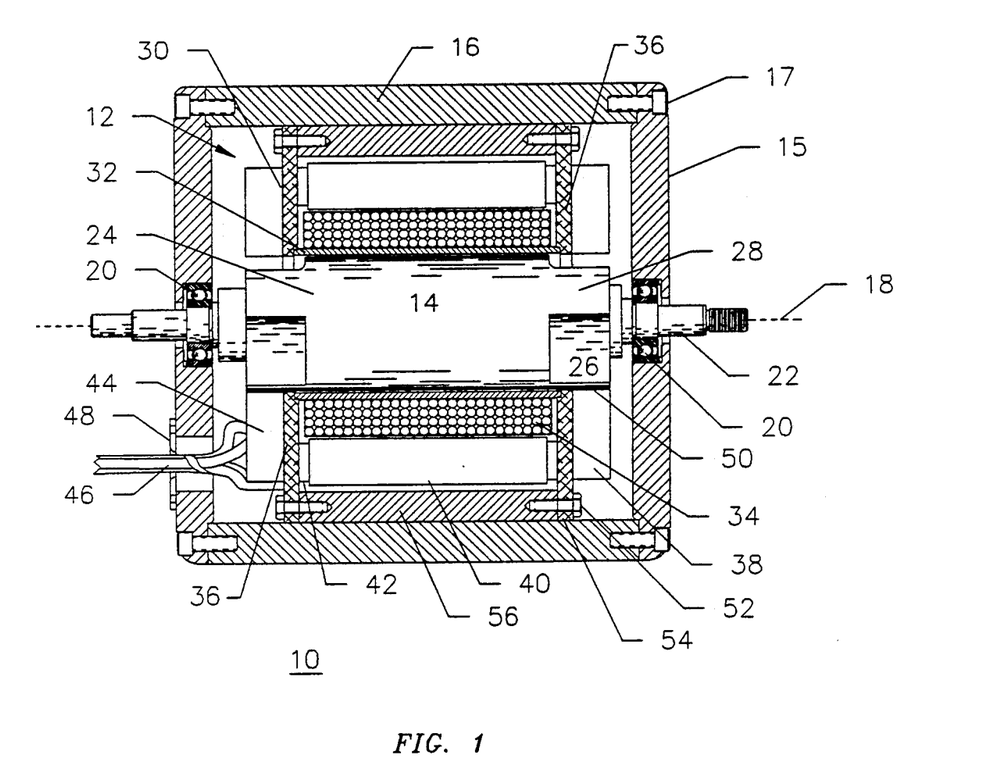
FIG. 1 is a cross-sectional view from the side of an inductor type dynamoelectric machine having a stator assembly mounted in a housing in accordance with the principles of the present invention.

In FIG. 1, a transverse-pole AC inductor type rotating dynamoelectric machine, constructed in accordance with the principles of the present invention is shown. The machine, generally denoted 10, includes a stationary stator assembly 12 surrounding a rotatable, coil-less rotor 14. A surrounding housing or frame 16 peripherally encloses stator assembly 12. End shields 15 are secured by threaded fasteners 17 to each end of housing 16 and rotatably support ends of rotor 14.

Rotor 14 extends along and is coaxial with a longitudinal axis 18. The rotor preferably has a solid one-piece construction and is supported by bearings 20, at each end of rotor shaft 22. Bearings 20 are mounted within end shields 15. Rotor 14 has a central cylindrical portion 24 provided with circumferentially spaced, axially extending surface recesses or cutouts 26 at the ends thereof, which define a desired number of lobes 28 at each end of the transverse pole rotor, in a manner known in the art. The rotor can be constructed of any available magnetic material, for example, carbon steel.

Stator assembly 12 includes an internal spool-like support structure 30. Support structure 30 has a central, generally cylindrical portion or tube 32 which is coaxial with longitudinal axis 18 and defines an interior, longitudinally extending, central passageway for receiving rotor 14. Field (or DC exitation) windings 34 are coiled about and supported by the exterior surface of tube 32.

Stator support structure 30 also includes a pair of end portions or plates 36 extending radially outward from the ends of tube 32. End portions 36 serve to mount and precisely position a plurality of circumferentially distributed, U-shaped (also referred to as C- or arch-shaped) armature core elements 38. Each armature core element 38 is preferably provided with an individual AC armature coil 40 wound about, and supported by a generally longitudinally extending base portion 42 of the armature element. Legs 44 extend radially inward from each end of base portion 42 of armature element 38. Armature core elements 38 are made of magnetic material while support structure 30 is composed of non-magnetic material, for example, aluminum. Electrical leads 46 from the field and armature coils extend through a suitable connector 48 mounted in one of the end shields 15.

In accordance with the principles of the present invention, stator assembly 12 is positioned and mounted within housing 16 by threaded fasteners 52 extending through radial extensions 54 of end portions 36 into intermediate mounting supports 56. Mounting supports 56 are circumferentially distributed about and secured to the interior of housing 16. The mounting arrangement is described in much greater detail hereinafter.

Operation of machine 10 is typical of synchronous AC machines in that, if electric current is applied to the field windings 34, and the rotor 14 is rotated by some external means, voltage will be induced in the armature windings 40 in the manner of a generator. Similarly, if the armature windings are energized in a fashion such as to produce a rotating flux wave at the gap 50, which exists between the radially innermost ends of armature elements 38 and the rotor lobe surfaces 28, as is done in polyphase, AC synchronous machines, the rotor 14 of the machine will be urged to follow the armature flux wave and rotate in the manner of an electric motor.

Further details of the construction and operation, and of the benefits afforded by an inductor type rotating dynamoelectric machine of this configuration can be obtained by referring to U.S. Pat. No. 4,786,834. The end portions 36 of spool-like support structure 30 can be of a laminate construction, as described in commonly owned, copending U.S.application Ser. No. 226,048, filed Jul. 29, 1988, now U.S. Pat. No. 4,864,176.

Figure 2:
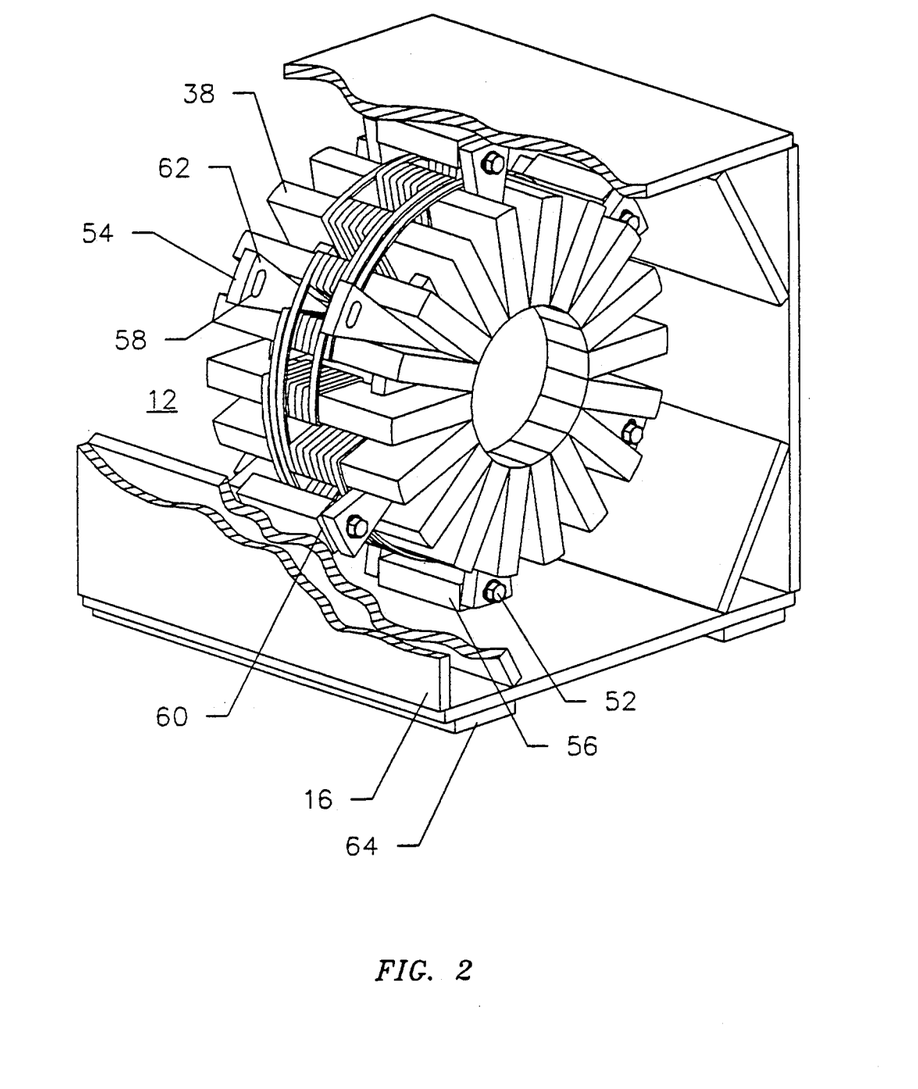
FIG. 2 is a partially cut-away isometric view of one embodiment of the stator mounting arrangement of the present invention.

A preferred embodiment of the improved mounting arrangement of the present invention is illustrated in FIG. 2. As shown in this partially cut-away perspective view, stator assembly 12 is secured within housing or frame 16 by threaded fasteners 52 extending, through oversized, e.g., slotted, mounting holes 58 in radial extensions 54, into the end faces 60 of mounting supports 56. Mounting supports 56 extend in a generally axial direction and are sandwiched between the axially inner faces 62 of a pair of substantially axially aligned radial extensions 54. Mounting supports 56 are circumferentially distributed about the interior of housing 16 and are, in turn, supported by and secured to the housing or frame members, in any known fashion. Housing 16 can be conveniently provided with conventional mounting feet 64.

Figure 3:
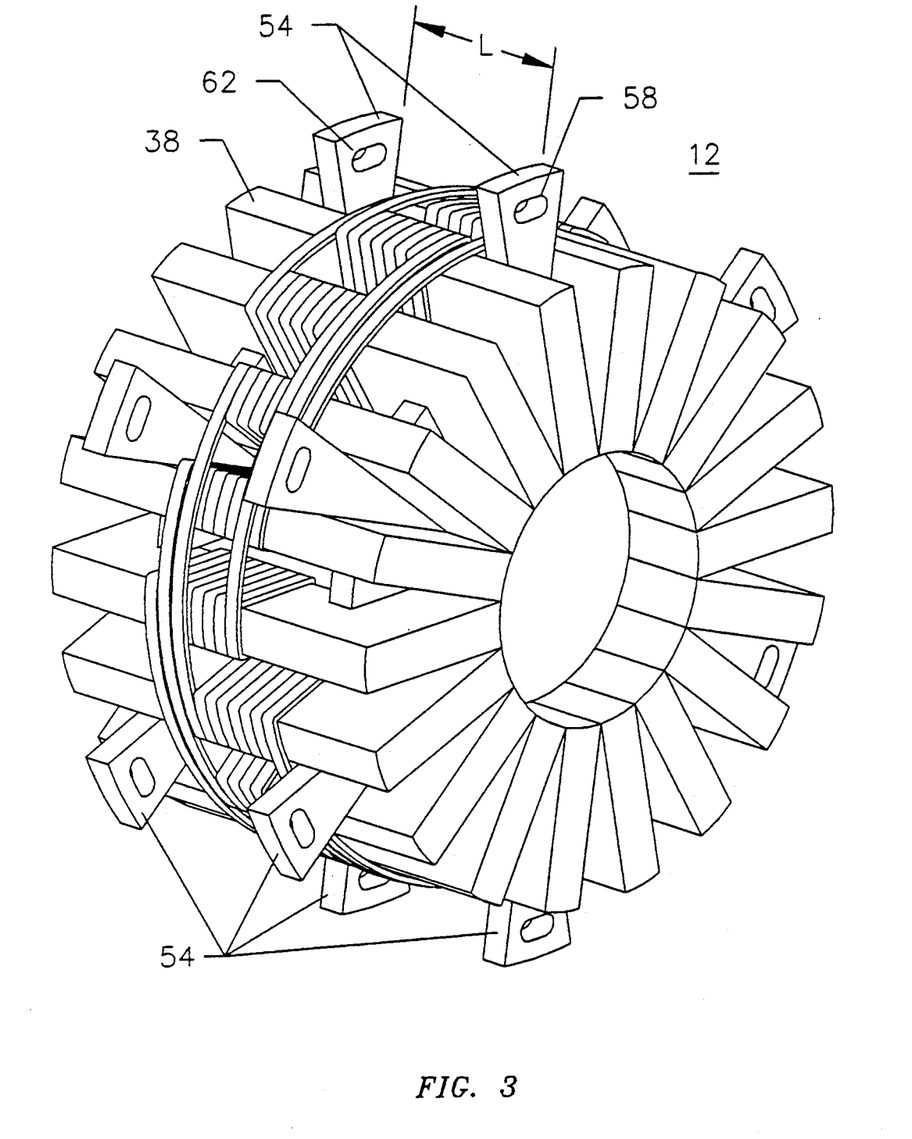
FIG. 3 is an isometric view of a stator assembly which has been modified for mounting in accordance with the principles of the present invention.
Figure 4:
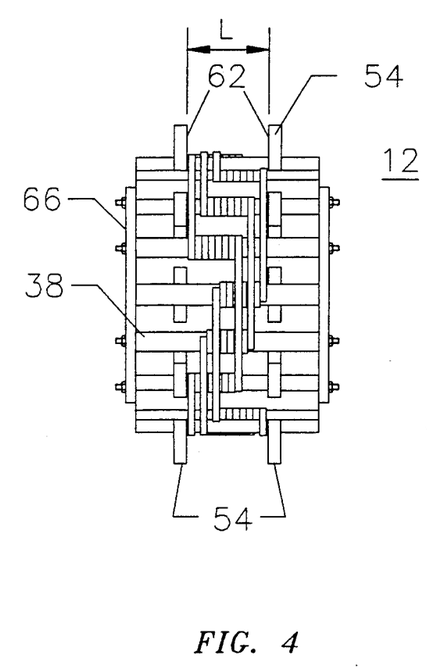
FIG. 4 is a plan view from the side of a stator assembly.
Figure 5:
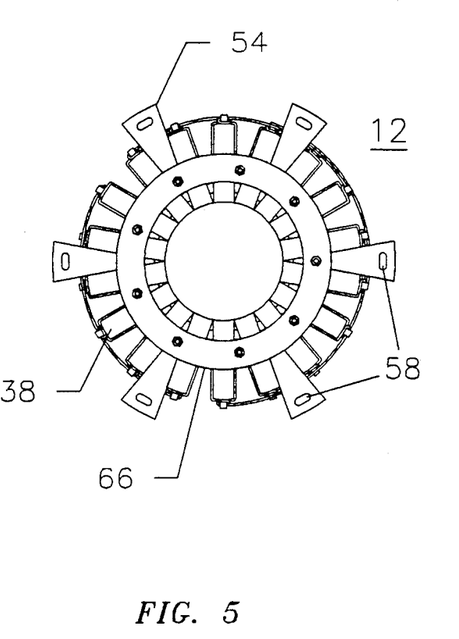
FIG. 5 is a front elevational view of the stator assembly of FIG. 4.

Stator assembly 12 is most clearly depicted in FIGS. 3-5. The stator assembly is provided with multiple sets or pairs of substantially axially aligned radial extensions 54 which extend outwardly beyond the outer periphery of the array of armature elements 38. The sets of radial extensions are preferably evenly spaced about the circumference of the stator assembly to help center the assembly about the central longitudinal axis. The extensions in a pair may be slightly offset circumferentially in order to permit or accommodate skewing of the armature core elements along the longitudinal direction.

In accordance with the principles of the present invention each radial extension 54 is, provided with an axially extending mounting hole 58 (See FIGS. 3 and 5), near its outer terminus, for receiving a fastener therein. Mounting holes 58 are preferably oversized in comparison to the shaft of the fastener, e.g., slotted in a circumferential direction, in order to allow for lateral adjustment and/or longitudinal skewing of the stator assembly, as desired, during or after mounting of the assembly within the housing. Each pair of radial extensions 54 has opposed, axially inner laterally extending faces 62 separated by an axial span or length L (See FIGS. 3 and 4). Since as indicated in FIG. 1 radial extensions 54 are generally formed from end plates 36 of spool-like support structure 30, length L is a function of the axial extent of the central cylindrical portion 32 of support structure 30. Annular rings 66 (Shown in FIGS. 4 and 5) can be bolted to end plates 36 for purposes of clamping armature elements 38 to the support structure 30.

Figure 6:
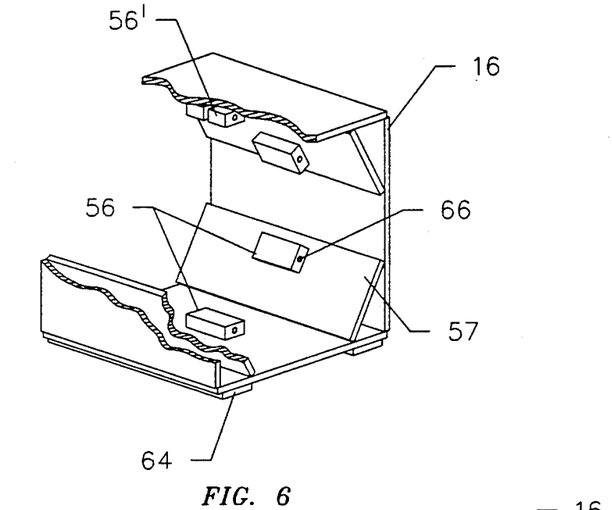
FIG. 6 is a partially cut-away isometric view of a fabricated multi-piece housing with circumferentially distributed mounting supports on the interior thereof.
Figure 7:
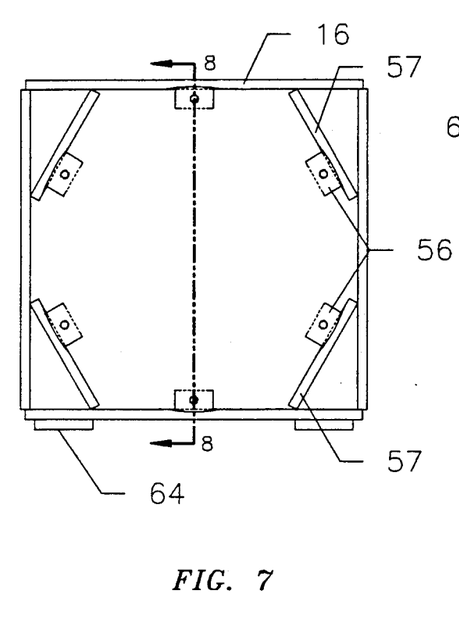
FIG. 7 is a front elevational view of the housing of FIG. 6.
Figure 8:
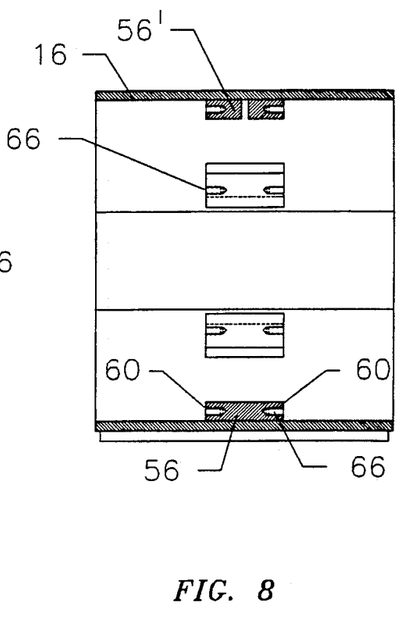
FIG. 8 is a sectional view along lines 8—8 of FIG. 7.

A fabricated multi-piece housing or frame assembly 16 designed to receive, position and secure stator assembly 12, is illustrated in FIGS. 6-8. (For clarity of depiction, stator assembly 12 is not shown in FIGS. 6-10 or 15). Circumferentially distributed about the interior of housing 16 are a plurality of axially extending mounting supports 56. Supports 56 match in number and circumferential spacing the sets of radial extensions on stator assembly 12 (depicted in FIGS. 1-5). Supports 56 can be secured directly to the inside housing wall or to angled frame members 57 (See FIGS. 6 and 7) for correct circumferential positioning. Appropriate axial prepositioning of supports 56 ensures that the stator assembly 12, when mounted, is correctly positioned in the axial direction.

As best seen in the cross-sectional view of FIG. 8, each mounting support 56 has a pair of axially outer, transversely extending end faces 60. End faces 60 are axially space a distance substantially equal to the axial span L (Shown in FIGS. 3 and 4) between the opposed inner faces of a pair of radial extensions. A threaded mounting hole 66 extends axially inward from each end face 60 for receiving a threaded fastener therein. Holes 66 are preferably located so as to axially align with the center of the oversized mounting aperture or slot 58 (Shown in FIGS. 2 and 3) on an associated radial extension 54.

Each mounting support 56 is associated with a different pair of radial extensions 54 of the stator assembly 12 (As shown in FIG. 2). Mounting support 56 may extend for substantially the full axial span between the associated pair of radial extensions or, as illustrated at 56' in FIG. 8, may comprise two axially spaced mounting blocks. The latter arrangement is especially suitable for larger machines.

Figure 9:
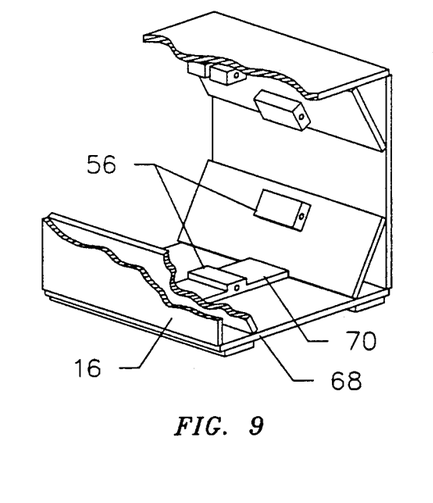
FIG. 9 is a partially cut-away isometric view of a multi-piece housing including a mounting block incorporating a transverse stiffener.
Figure 10:
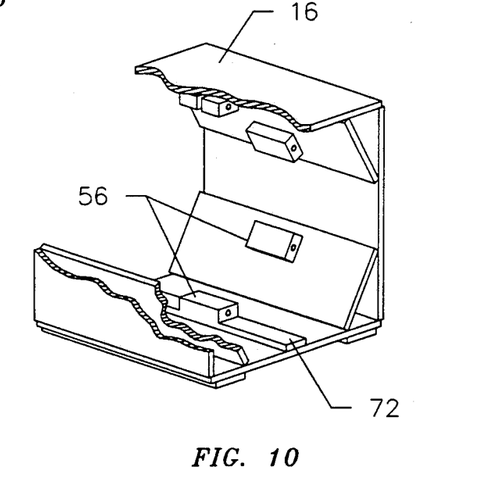
FIG. 10 is a partially cut-away isometric view of a multi-piece housing including a mounting block incorporating an axial stiffener.

FIGS. 9 and 10 illustrate similar mounting frames to that shown in FIG. 6, with the addition of stiffener elements incorporated in at least one of the mounting supports. In FIG. 9 the mounting support 56 secured to the bottom member 68 of frame 16 incorporates a transverse stiffener element 70 while in FIG. 10 an axial stiffener 72 is incorporated with this mounting support.

Figure 11:
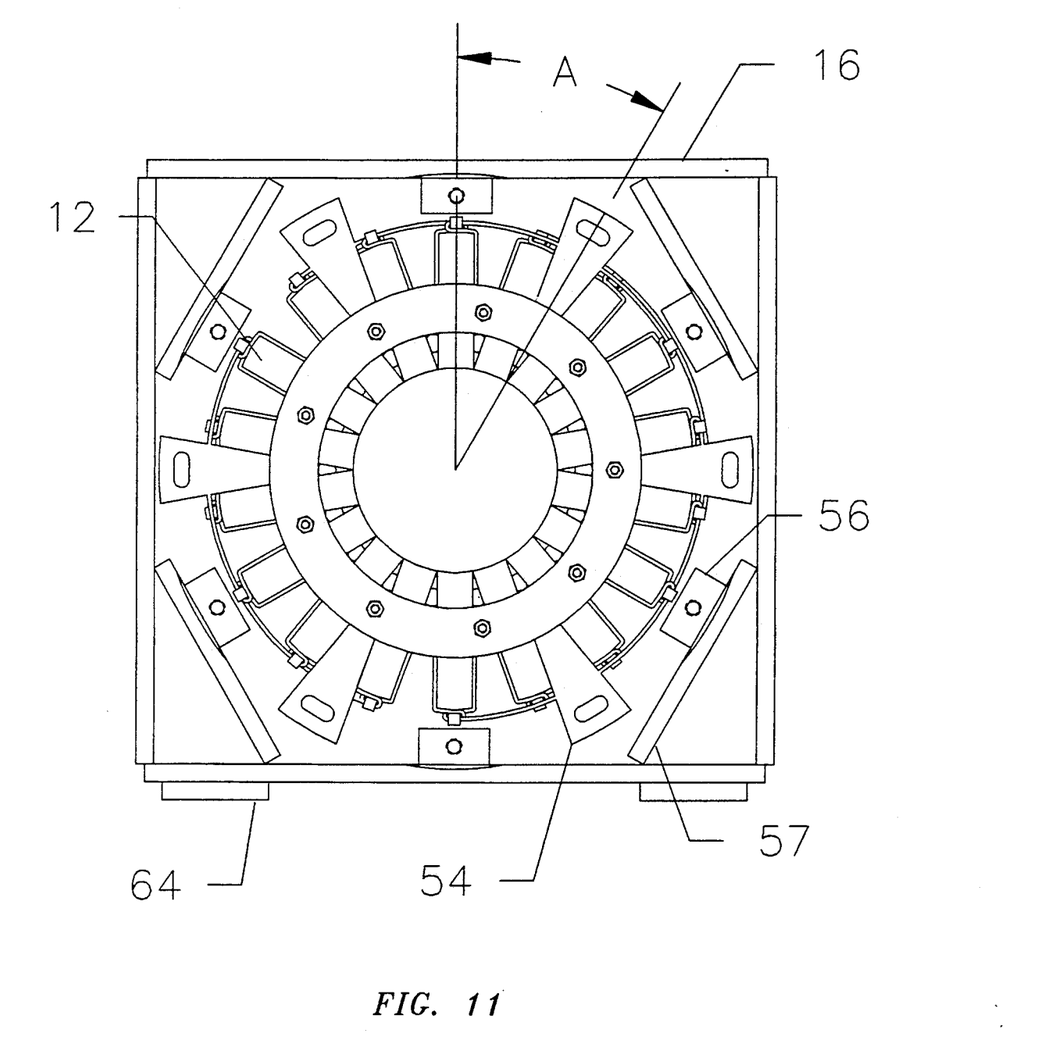
FIG. 11 is an elevational view depicting the insertion of the stator assembly within the housing.
Figure 12:
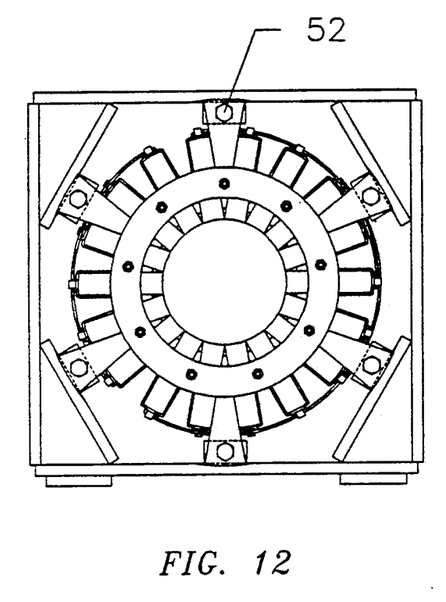
FIG. 12 is a front elevational view of a stator assembly mounted in a housing in accordance with the principles of the present invention.

FIG. 11 illustrates insertion of stator assembly 12 in housing 16. Entry is accomplished by moving stator assembly 12 axially into the frame 16 at a rotated radial angle, shown as angle A in FIG. 11. The radial extensions 54 are circumferentially sized and spaced so that the extensions of the first end support that enters the housing 16 pass by or clear the mounting supports 54. The stator assembly 12 is moved axially into a position so that when rotated about the longitudinal axis through angle A the inner faces 62 of the radial extensions are adjacent to and in substantial axial alignment with the end faces 60 of the associated mounting support 56. This aligns the corresponding mounting holes in the radial extensions and mounting supports allowing rigid connection therebetween by insertion of a threaded fastener 52. See FIGS. 12-14.

Figure 14:
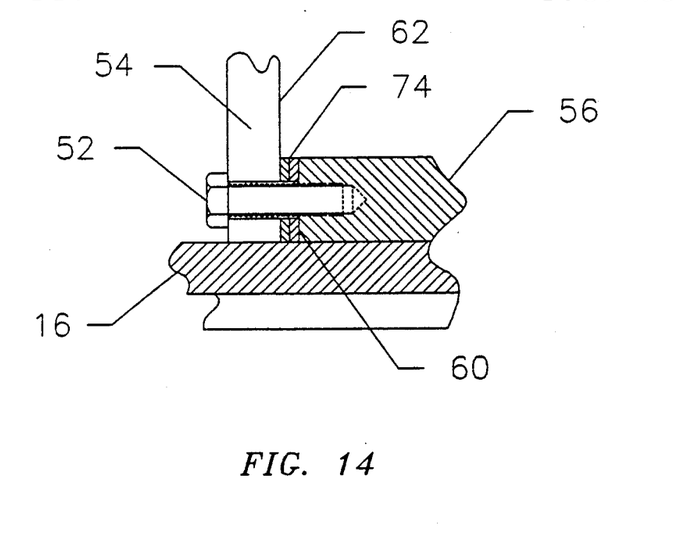
FIG. 14, is a blow-up of a portion of the mounting arrangement of FIG. 13.

As shown in FIG. 14, shims 74 can be interposed between the inner face 62 of a radial extension 54 and the end face 60 of mounting support 56 to allow for adjustment, as desired, of the axial position of the mounted stator assembly.

Figure 13:
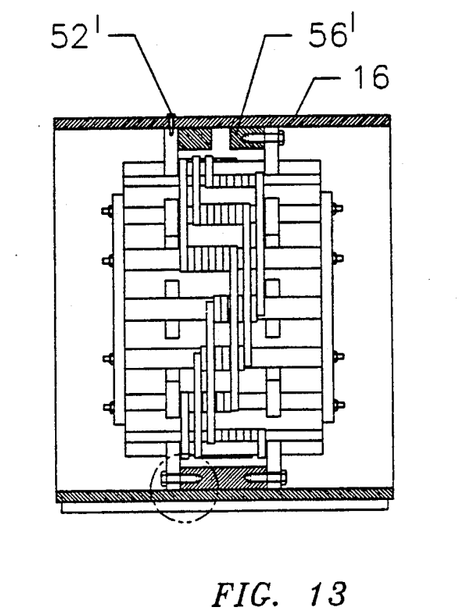
FIG. 13 is a side elevational view further illustrating the mounting arrangement shown in FIG. 12.

Although it is presently preferred to attach the radial extensions 54 to the mounting supports 56 with axially extending fasteners 52 as described, once the stator assembly has been properly axially positioned by the mounting supports, it can be secured within the frame in other ways. For example, as illustrated in FIG. 13, fasteners 52' can be inserted radially through frame 16 into radial extensions 54. Alternatively, the stator assembly can be interference fit once properly axially located by supports 56. The latter approach, however, would not permit ready adjustment (or fine tuning) of the position of the mounted stator assembly.

Figure 15:
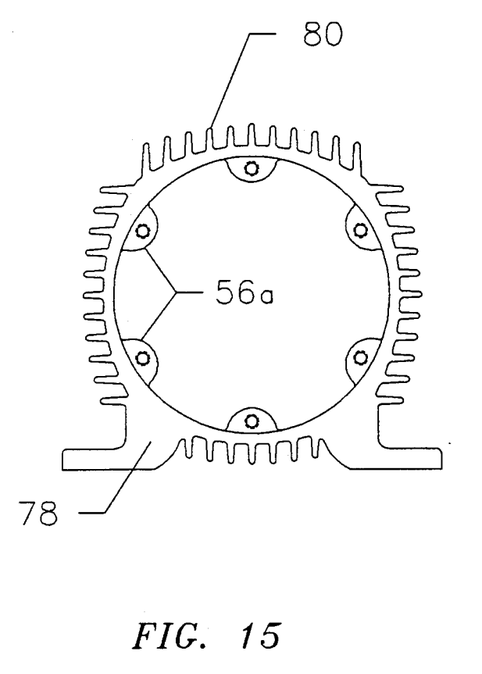
FIG. 15, is a front elevational view of a cast housing incorporating integral cast mounting supports.
Figure 16:
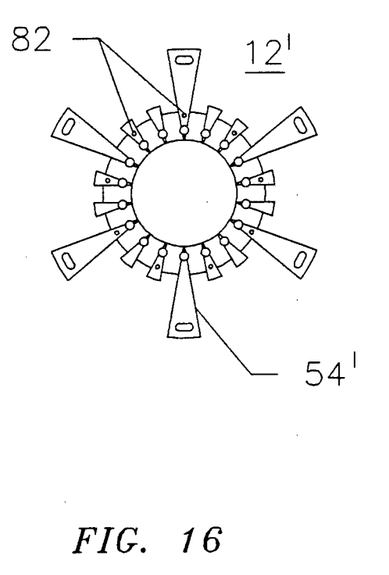
FIG. 16 is a front elevational view of a stator assembly employing laminated end plates having radial extensions modified for mounting in accordance with the principles of the present invention.

FIG. 15 depicts a cast frame embodiment of the present invention. In this embodiment, the circumferentially spaced mounting supports 56a are cast integral with the frame 78 and cooling fins 80, in a manner well known in the art. FIG. 16 illustrates a stator assembly 12' which can be secured within cast frame 78 (depicted in FIG. 15) using axially extending threaded fasteners as previously described. Stator assembly 12' is similar to the stator assembly previously described except that the end plates of the stator support structure, including radial extensions 54', are of a laminate construction. Fasteners 82 can be used to hold the laminations together. Further details of a such a laminate construction are presented in commonly owned, copending U.S. Pat. Ser. No. 226,048, now U.S. Pat. No. 4,864,176.

From the foregoing description, it will be apparent that an improved stator mounting arrangement has been developed which ensures accurate and secure mounting of a stator assembly within a housing in a time and cost efficient manner. Although several embodiments have been described and depicted herein, it will be apparent to those skilled in this art that various modifications, additions, substitutions, etc. may be made without departing from the spirit of the invention, the scope of which is defined by the claims appended hereto.

What is claimed is:

1. Apparatus for positioning and mounting a stator within a housing with the stator extending along and about a central longitudinal axis, comprising:

a support structure for the stator, the support structure having a plurality of circumferentially spaced pairs of axially separated radially outwardly projecting extensions, the extensions of each pair having opposed spaced apart axially inner laterally extending faces;

a plurality of mounting supports circumferentially distributed about the interior of the housing, each mounting support being associated with a different one of the pairs of extensions, each mounting support having a pair of laterally extending axially outer end faces, the end faces of each mounting support being axially spaced apart a distance substantially equal to the axial span between opposed axially inner laterally extending faces of a pair of said extensions associated with the support; and means for securing the stator within the housing such that said end faces of the mounting supports are sandwiched between the axially inner laterally extending faces of the pairs of extensions.

2. The apparatus of claim 1 wherein:

the extensions in each pair of extensions are substantially aligned along the axial direction;

the mounting supports match in number and circumferential spacing the plurality of pairs of extensions;

the extensions are circumferentially sized and spaced such that the stator can be inserted in the housing axially to a desired depth without interference with the mounting supports; and the mounting supports are prepositioned in the axial direction such that when the stator is secured within the housing, the stator is located in a desired axial position.

3. The apparatus of claim 2 wherein the means for securing the stator within the housing comprises fastener means for fastening each pair of extensions to the end faces of one of the mounting supports.

4. The apparatus of claim 3 wherein the extensions are provided with oversized mounting holes which in combination with the fastener means permit lateral adjustment of the position of the stator.

5. The apparatus of claim 4 further comprising shim means for interposing between end faces of the mounting supports and axially inner faces of the extensions to facilitate axial adjustment of the position of said stator.

6. The apparatus of claim 4 wherein the axially outer end faces of the mounting supports are provided with threaded mounting holes for receiving said fastener means.

7. The apparatus of claim 6 wherein the mounting supports are cast integral parts of the housing.

8. The apparatus of claim 6 wherein at least one of the mounting supports comprises a pair of axially spaced mounting blocks.

9. The apparatus of claim 6 wherein the housing comprises a fabricated multi-piece housing assembly.

10. The apparatus of claim 9 wherein an extended stiffener element is incorporated with at least one of the mounting supports.

11. The apparatus of claim 6 wherein the fastener means comprises removable threaded fasteners; the oversized mounting holes comprise slots elongated in the circumferential direction; the threaded holes in the end faces of the mounting supports are located so as to align with a center of the slot in an associated extension; and the extensions comprise non-magnetic material.

12. The apparatus of claim 6 wherein said stator includes: a non-magnetic spool-like support structure having a hollow, elongated central portion extending about and along the longitudinal axis, said non-magnetic spool-like support structure having axially spaced end portions that extend radially outward relative to the longitudinal axis from respective ends of said central portion, the extensions being a pair of said axially spaced end portions; and a circumferentially distributed plurality of generally U-shaped, generally longitudinally extending armature cores supported by the end portions of said spool-like support structure.

13. The apparatus of claim 12 wherein said stator further comprises a field winding coiled about the central portion of said spool-like support structure; and further comprising: a unitary rotor of magnetic material disposed coaxially within said spool-like support structure, and bearing means for rotatably mounting said rotor for rotation within said spool-like support structure.

* * * * *

UNITED STATES PATENT AND TRADEMARK OFFICE
CERTIFICATE OF CORRECTION

PATENT NO. : 5,006,748
DATED : April 9, 1991
INVENTOR(S) : Pamela B. Wintermute

It is certified that error appears in the above-indentified patent and that said Letters Patent is hereby corrected as shown below:

On the title page section [75] should read as follows:

[75] Inventor: Pamela B. Wintermute, Glenmont, N.Y.

Signed and Sealed this

Second Day of November, 1993

Attest:

BRUCE LEHMAN

Attesting Officer

Commissioner of Patents and Trademarks